(12) United States Patent
Dejanovic et al.

(10) Patent No.: US 11,895,005 B1
(45) Date of Patent: Feb. 6, 2024

(54) NETWORK DEVICES WITH HARDWARE ACCELERATED TABLE UPDATES

(71) Applicant: Arista Networks, Inc., Santa Clara, CA (US)

(72) Inventors: Thomas Dejanovic, Sydney (AU); Roman Onosovski, Belleair, FL (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/074,266

(22) Filed: Dec. 2, 2022

(51) Int. Cl.
*H04L 45/02* (2022.01)
*H04L 45/00* (2022.01)

(52) U.S. Cl.
CPC .............. *H04L 45/02* (2013.01); *H04L 45/38* (2013.01)

(58) Field of Classification Search
CPC ................................ H04L 45/02; H04L 45/38
USPC .......................................................... 709/238
See application file for complete search history.

(56) References Cited

U.S. PATENT DOCUMENTS

| | | | |
|---|---|---|---|
| 5,842,196 A | 11/1998 | Agarwal et al. | |
| 6,826,561 B2 * | 11/2004 | Cao | G06F 16/90344 |
| 6,985,483 B2 * | 1/2006 | Mehrotra | H04L 45/742 |
| | | | 707/999.003 |
| 7,366,171 B2 * | 4/2008 | Kadambi | H04L 12/4625 |
| | | | 370/396 |
| 7,739,423 B2 | 6/2010 | Tatapudi et al. | |
| 11,496,391 B1 * | 11/2022 | Przygienda | H04L 45/745 |
| 11,727,323 B2 * | 8/2023 | Haramati | G06F 16/2379 |
| | | | 705/52 |
| 2005/0149542 A1 | 7/2005 | Cosic | |
| 2010/0023541 A1 | 1/2010 | Cosic | |
| 2011/0191303 A1 * | 8/2011 | Kaufman | G06F 7/00 |
| | | | 707/684 |
| 2011/0235551 A1 * | 9/2011 | Kakivaya | H04L 45/02 |
| | | | 370/256 |
| 2014/0006549 A1 * | 1/2014 | Narayanaswamy | H04L 67/63 |
| | | | 709/217 |
| 2016/0352815 A1 * | 12/2016 | Mozolewski | G06F 9/5083 |
| 2017/0046377 A1 | 2/2017 | Barber et al. | |
| 2017/0163575 A1 * | 6/2017 | Wang | H04L 49/9094 |
| 2017/0364446 A1 * | 12/2017 | Pham | G06F 12/1027 |
| 2018/0270132 A1 * | 9/2018 | Hashimoto | H04L 43/0823 |
| 2019/0158388 A1 * | 5/2019 | Bianchi | H04L 45/64 |
| 2019/0260672 A1 * | 8/2019 | Haas | H04L 67/104 |
| 2019/0320046 A1 * | 10/2019 | Bifulco | H04L 69/163 |
| 2019/0334808 A1 * | 10/2019 | Nandy | H04L 45/28 |
| 2022/0014451 A1 * | 1/2022 | Naik | H04L 43/026 |

(Continued)

OTHER PUBLICATIONS

Wang et. al., "An Efficient IP Routing Lookup by Using Routing Interval", Dec. 2021, Journal of Communications And Networks, vol. 3, No. 4, pp. 374-382.*

*Primary Examiner* — Anthony Mejia
(74) *Attorney, Agent, or Firm* — Treyz Law Group; Jason Tsai (57) ABSTRACT

A network device can include a main processor and a packet processor. A method is provided that includes storing a table of values in the packet processor, using the packet processor to receive from the main processor a value that can be used to update the table of values, and using acceleration hardware in the packet processor to update the table of values based on the value received from the main processor without any additional interaction with the software running on the main processor.

19 Claims, 9 Drawing Sheets

(56) References Cited

U.S. PATENT DOCUMENTS

2022/0222640 A1\* 7/2022 Mimassi .............. G06Q 20/202
2022/0417179 A1\* 12/2022 Huang ................. H04W 40/24

\* cited by examiner

NETWORK DEVICES WITH HARDWARE ACCELERATED TABLE UPDATES

BACKGROUND

A network switch can include a central processing unit (CPU) coupled to a packet processor. The packet processor can be implemented as an application specific integrated circuit (ASIC) or a field programmable gate array (FPGA). A routing table can be stored in the packet processor. A routing table contains information that is used to forward an incoming packet along a path towards its destination, whereas other data structures can be used to filter or otherwise transform packets. Routing tables and packet filter data structures are typically large data structures containing hundreds or thousands of entries.

It can be challenging to update a routing table in the packet processor. Inserting or deleting a value from the routing table can require software on the CPU to perform thousands of read and write operations with the packet processor. Using faster interfaces between the CPU and packet processor can help speed up the time per read and write access but will not help in reducing the requisite number of read/write accesses that needs to be performed by the CPU. It is within this context that the embodiments herein arise.

DETAILED DESCRIPTION

A network device such as a router or switch can store large data structures such as one or more tables of values. These data structures can be stored within a packet processor that communicates with a main processor such as a central processing unit (CPU). The data structures can be used to store any type of networking information or network configuration data. As an example, a network device can be used to maintain a routing table containing information for routing or forwarding incoming data packets to their desired destination. As another example, a network device can be used to maintain a records table containing a list of keys for filtering data packets in a sampled flow (sFlow) system.

Methods and circuitry are provided for performing table updates efficiently while minimizing interactions between the CPU and the packet processor. Each table can be maintained as a sorted list of values and can have $2^n-1$ entries, where n is any positive integer including but not limited to 9, 10, 11, 12, 13, 14, 15, 10-15, 10-20, or more than 20. The CPU can issue a table update command or an update request such as a command/request to insert a new value or to delete an existing value from a table.

To insert a new value into the table, a binary search algorithm or other search algorithm can be used to determine where to insert the new value in the sorted list of values, and all values at and subsequent to that insert location in the table can be shifted one entry up (assuming the smallest value is stored at the bottommost entry in the table). The last value in the table can be replicated to fill (pad) the topmost entries in the table. The search, insertion, and shifting of values required to carry out the insert function can all be performed using dedicated hardware circuitry such as a finite state machine within the packet processor without any software interaction from the CPU.

To delete an existing value from the table, a binary search algorithm can be used to find the value to be deleted, and all values subsequent to that deletion location in the table can be shifted one entry down (again assuming that the smallest value is stored at the bottommost entry in the table). The last value in the table can be replicated to fill (pad) the topmost entries in the table. The search, deletion, and shifting of values required to carry out the deletion function can all be performed using dedicated hardware circuitry such as a finite state machine within the packet processor without any software interaction from the CPU. Using dedicated hardware in the packet processor to accelerate an insert or delete function can reduce the number of accesses required to update a large data structure to a single access rather than requiring the CPU to perform a large number of write and read accesses proportional to the size of the table.

Figure 1:
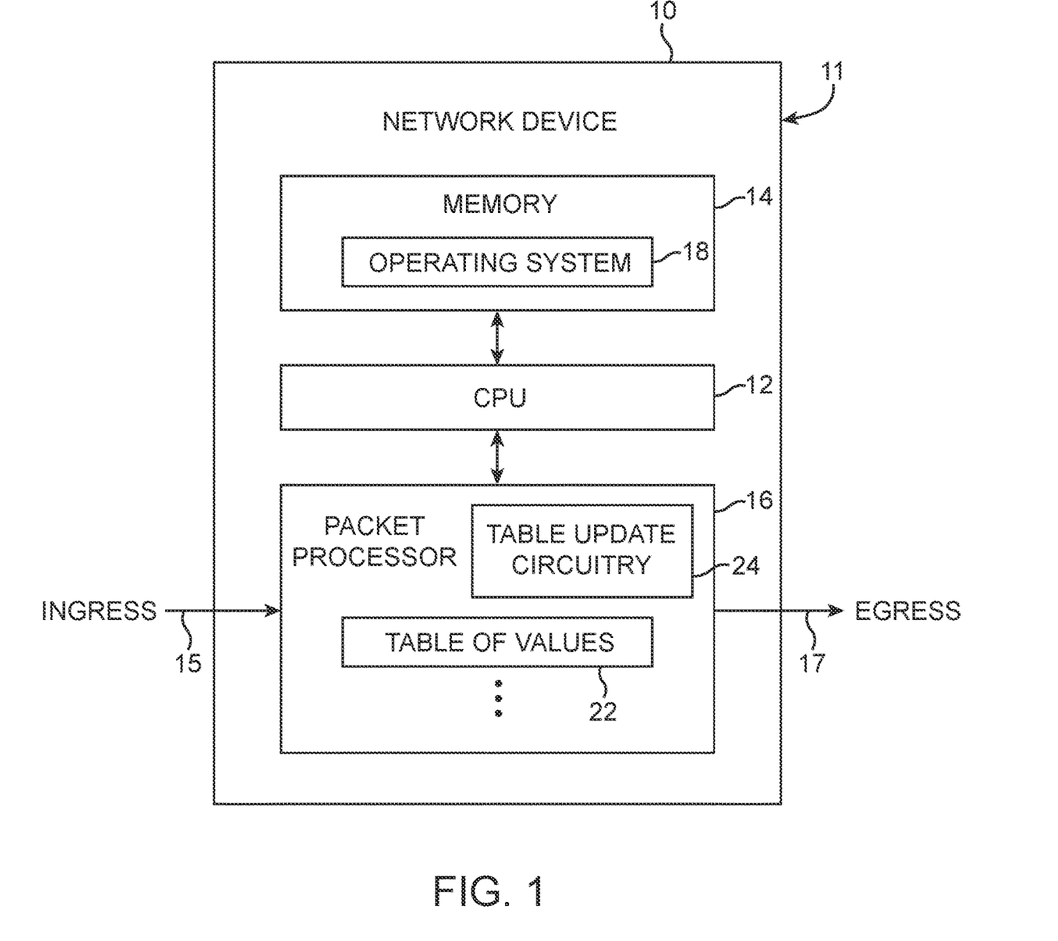
FIG. 1 is a diagram of an illustrative network device configured to route data packets in accordance with some embodiments.

FIG. 1 is a diagram of a network device such as network device 10 that can be used to store a table of values. Network device 10 may be a router, a switch, a bridge, a hub, a repeater, a firewall, a device serving other networking functions, a device that includes a combination of these functions, or other types of network elements. As shown in FIG. 1, network device 10 may include processing circuitry such as a central processing unit (CPU) 12, storage circuitry including memory 14, and a packet processing circuit such as packet processor 16 all disposed within a housing 11 of device 10. Housing 11 may be an exterior cover (e.g., a plastic exterior shell, a metal exterior shell, or an exterior shell formed from other rigid or semirigid materials) that provides structural support and protection for the components mounted within the housing. In general, processing unit 12 may represent processing circuitry based on one or more microprocessors, graphics processing units (GPUs), host processors, general-purpose processors, microcontrollers, digital signal processors, application specific integrated circuits (ASICs), application specific system processors (ASSPs), programmable logic devices such as field-programmable gate arrays (FPGAs), a combination of these processors, or other types of processors. Central processing unit 12 may sometimes be referred to herein as a main processor 12.

Processor 12 may be used to run a network device operating system such as operating system (OS) 18 and/or other software/firmware that is stored on memory 14. Memory 14 may include non-transitory (tangible) computer readable storage media that stores operating system 18 and/or any software code, sometimes referred to as program instructions, software, data, instructions, or code. Memory 14 may include nonvolatile memory (e.g., flash memory or other electrically-programmable read-only memory configured to form a solid-state drive), volatile memory (e.g., static or dynamic random-access memory), hard disk drive storage, and/or other storage circuitry. The processing circuitry and storage circuitry described above are sometimes referred to collectively as control circuitry. Processor 12 and memory 14 are sometimes referred to as being part of a control plane of network device 10.

Operating system 18 in the control plane of network device 10 may exchange network topology information with other network devices using a routing protocol. Routing protocols are software mechanisms by which multiple network devices communicate and share information about the topology of the network and the capabilities of each network device. For example, network routing protocols may include Border Gateway Protocol (BGP) or other distance vector routing protocols, Enhanced Interior Gateway Routing Protocol (EIGRP), Exterior Gateway Protocol (EGP), Routing Information Protocol (RIP), Open Shortest Path First (OSPF) protocol, Label Distribution Protocol (LDP), Multiprotocol Label Switching (MPLS), Intermediate System to Intermediate System (IS-IS) protocol, or other Internet routing protocols (just to name a few).

Packet processor 16 is oftentimes referred to as being part of a data plane or forwarding plane. Packet processor 16 may represent processing circuitry based on one or more microprocessors, general-purpose processors, application specific integrated circuits (ASICs), programmable logic devices such as field-programmable gate arrays (FPGAs), a combination of these processors, or other types of processors. Packet processor 16 receives incoming data packets via ingress port 15, analyzes the received data packets, processes the data packets in accordance with a network protocol, and forwards (or drops) the data packet accordingly.

A data packet is a formatted unit of data conveyed over the network. Data packets conveyed over a network are sometimes referred to as network packets. A group of data packets intended for the same destination should have the same forwarding treatment. A data packet typically includes control information and user data (payload). The control information in a data packet can include information about the packet itself (e.g., the length of the packet and packet identifier number) and address information such as a source address and a destination address. The source address represents an Internet Protocol (IP) address that uniquely identifies the source device in the network from which a particular data packet originated. The destination address represents an IP address that uniquely identifies the destination device in the network at which a particular data packet is intended to arrive.

Data packets received in the data plane may optionally be analyzed in the control plane to handle more complex signaling protocols. Packet processor 16 may generally be configured to partition data packets received at ingress port 15 into groups of packets based on their destination address and to choose a next hop device for each data packet when exiting egress port 17. The choice of next hop device for each data packet may occur through a hashing process over the packet header fields, the result of which is used to select from among a list of next hop devices in a table of values 22 stored on memory in packet processor 16. Such table 22 listing the next hop devices for different data packets is sometimes referred to as a routing table, a hardware forwarding table, a hardware forwarding information base (FIB), or a media access control (MAC) address table. Routing table 22 may list actual next hop network devices that are currently programmed on network device 10 for each group of data packets having the same destination address. If desired, routing table 22 may also list actual next hop devices currently programmed for device 10 for multiple destination addresses (i.e., device 10 can store a single hardware forwarding table 22 separately listing programmed next hop devices corresponding to different destination addresses).

Conventionally, updating a routing table requires a significant number of CPU transactions. Consider a scenario in which a CPU wants to insert a new value into a routing table having 4000 entries. Once the CPU identifies where the new value needs to be inserted, the CPU needs to read out the existing value from the location of insertion, write in the new value, read out the existing value in the next entry, write in the previously read value into that next entry, and repeat this operation until all subsequent values in the table have been shifted one entry to the back to make room for the newly inserted value. If the new value needs to be inserted at the front of the table, then the CPU will need to perform around 4000 reads and 4000 writes to carry out one insertion. This can consume a lot of CPU time and limit the rate at which large data structures within the packet processor can be updated. Maintaining a shadow copy of the routing table in software can help reduce the number of required read operations since the CPU will already know what value needs to be written next, but the CPU will still need to perform hundreds or thousands of writes depending on where the new value needs to be inserted within the routing table.

In accordance with an embodiment, packet processor 16 may be provided with table update circuitry 24 configured to perform hardware accelerated update operations on table 22 that is stored on memory in packet processor 16. Table update circuitry 24 may be a finite state machine or other dedicated hardware configured to carry out a majority of actions needed to update one or more values in table 22 while minimizing interactions with the software running on processor 12. As an example, table update circuitry 24 may be configured to carry out most of the operations needed to insert one or more new values into table 22. As another example, table update circuitry 24 may be configured to carry out most of the operations needed to delete one or more existing values from table 22. The insert and delete functions are exemplary. If desired, table update circuitry 24 can also be used to facilitate with sorting at least a portion of the values in routing table 22, reordering at least a portion of the values in routing table 22, replacing one or more values in routing table 22, or to perform other types of updates on routing table 22.

Figure 2:
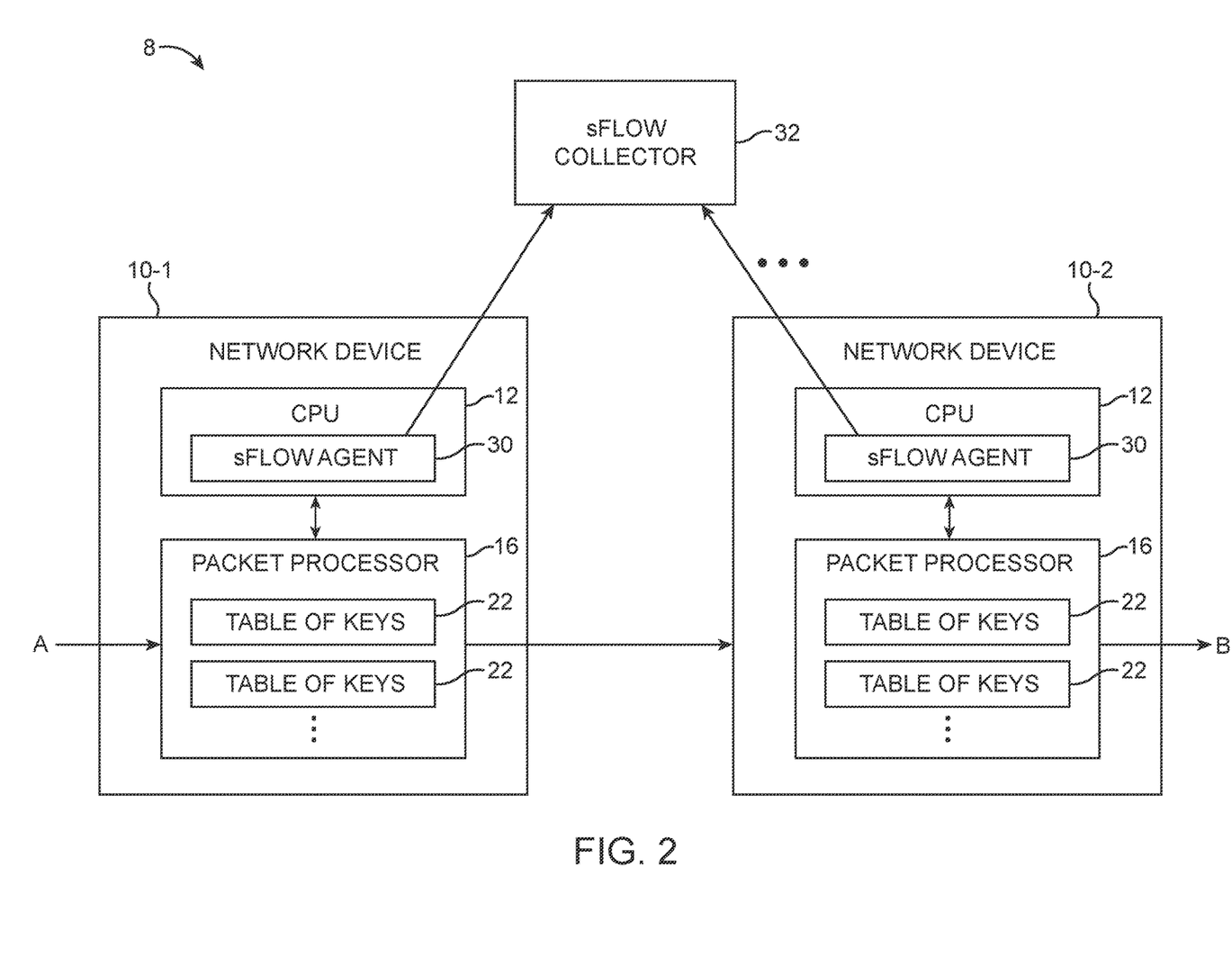
FIG. 2 is a diagram of an illustrative sampled flow (sFlow) system in accordance with some embodiments.

The example described above in which table 22 is a routing table is illustrative and not intended to limit the scope of the present embodiments. Table 22 may generally represent any data structure for storing a list of values in the packet processor. Table 22 may include hundreds, thousands, or even millions of entries. In accordance with other embodiments, table 22 may be used to store a list of keys for a sampled flow or "sFlow" system. FIG. 2 is a diagram showing an illustrative sFlow system 8. The sFlow technology is a traffic monitoring protocol that, as its name suggests, samples data packets and exports truncated packets at layer 2 (i.e., the data link layer) of the Open Systems Interconnection (OSI) model. As shown in FIG. 2, multiple network devices such as network devices 10-1 and 10-2 can operate in accordance with the sFlow protocol.

Each of the network devices 10 can run an sFlow agent such as sFlow agent 30 on its CPU 12. The sFlow agent 30 can perform various types of sampling including random sampling of packets and time-based sampling of counters to provide network-wide visibility. The random sampling of packets can randomly sample one out of every n packets to produce flow samples (e.g., samples that provide information on real data packets that are traversing a network device), whereas the time-based sampling of counters can produce counter samples (e.g., samples that provide live status information including the status, speed, and type of individual interfaces in a network device). The flow samples and counter samples gathered using the sFlow agents 30 can be conveyed as sFlow datagrams to a central server such as an sFlow collector subsystem 32 that analyzes the received sFlow datagrams and reports on the network traffic. The sampled data can be sent as User Datagram Protocol (UDP) packets to the sFlow collector 32. Each sFlow datagram can include information such as the sFlow version, the originating device's IP address, a sequence number, the number of samples it contains, flow samples, and counter samples. Collecting sFlow datagrams at a centralized sFlow collector 32 can be useful in tracking down network connectivity problems, analyzing traffic and allowing prioritization of critical applications, identifying top applications and protocols by the level of consumption, detecting excessive bandwidth usage and link congestion, detecting volumetric attacks, and can help facilitate network capacity planning and network topology adjustments.

The example of FIG. 2 in which sFlow collector 32 receives sFlow datagrams from at least two network devices 10-1 and 10-2 is illustrative. In general, an sFlow collector 32 can receive sampled data from two or more network devices 10, from three or more network devices 10, from four or more network devices 10, from four to ten network devices 10, from 10-100 network devices, or from more than 100 network devices.

The sFlow protocol may require an application that filters sFlow records (sometimes referred to as "keys") within sFlow packets. For example, it is sometimes necessary to pull one or more fields out of an sFlow packet and then compare the field against a permit list. Such permit list that is used for sFlow filter applications can also be stored as one or more tables 22 in packet processor. The permit list can include various records or flow keys. The flow keys can include forwarding parameters such as source address information, destination address information, ingress port information, egress port information, packet direction information, mask bits, and next hop information (just to name a few). Different types of keys can be stored in different tables 22 on a network device 10 (see, e.g., device 10-1 having two or more tables of keys 22 in packet processor 16). Each table 22 can be configured to store hundreds or thousands of keys and are thus sometimes referred to an sFlow records table or a key table.

Table update circuitry 24 of FIG. 1 can also be configured to update one or more values in a key table 22 while minimizing interactions with the software running on processor 12. As an example, table update circuitry 24 may be configured to carry out most of the operations needed to insert one or more new values into an sFlow key table 22. As another example, table update circuitry 24 may be configured to carry out most of the operations needed to delete one or more existing values from sFlow key table 22.

The insert and delete functions are exemplary. If desired, table update circuitry 24 can also be used to facilitate with sorting at least a portion of the values in one or more key table 22, reordering at least a portion of the values in one or more key tables 22, replacing one or more values in key table 22, or to perform other types of updates on key table 22.

Figure 3A:
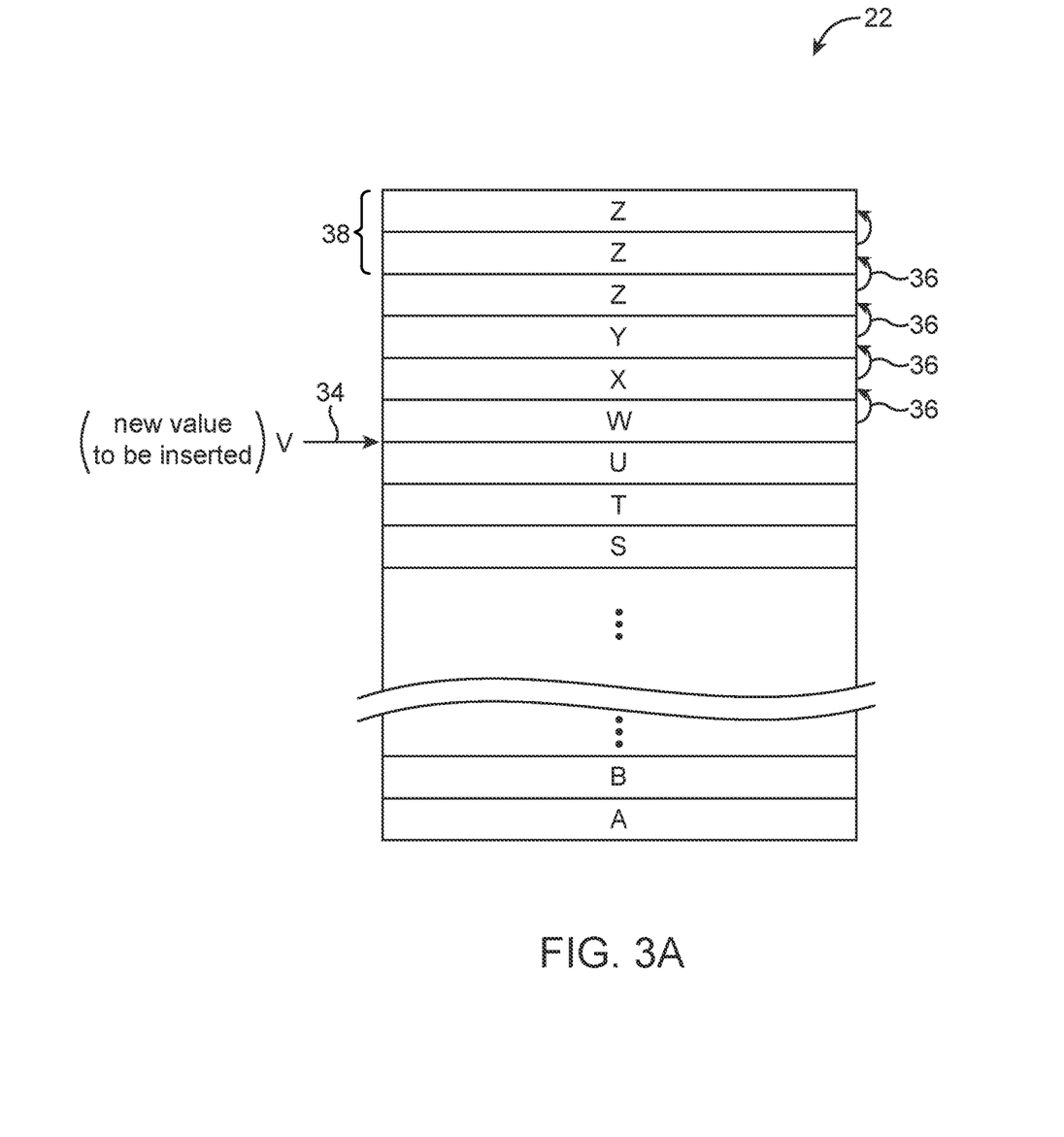
FIG. 3A is a diagram illustrating how a new value can be inserted into a sorted list in accordance with some embodiments.

FIG. 3A is a diagram illustrating how table update circuitry 24 can be used to insert a new value into table 22 (e.g., a routing table, a table of keys, or other data structure for storing a list of values). Table 22 may include $2^N-1$ entries, where N can be any positive integer. As examples, table 22 may include 1023 entries (if N is equal to 10), 2047 entries (if N is equal to 11), 4095 entries (if N is equal to 12), 8191 entries (if N is equal to 13), or 16383 entries (if N is equal to 14). Having ($2^N-1$) number of entries in table 22 can facilitate or help simplify the hardware that is used for certain searching algorithms such as the binary search algorithm with a Big O Notation of O(log N) in the worst case.

Table 22 may be maintained as a sorted list of values, where the smallest value is stored at the bottom of the table (see smallest value "A") and where the largest value is stored towards the top of the table (see greatest value "Z"). This is illustrative. If desired, the smallest value can be stored at the top of the table, whereas the largest value can be stored towards the bottom of the table. Device configurations in which the smallest value is stored at the bottom (lowermost) entry of table 22 are sometimes described herein as an example. The number of unique values stored in table 22 might not always be equal to the total size of table 22. In such scenarios, the greatest value in the sorted list can be copied to any remaining entries at the top of table 22 so that all entries are filled (e.g., the greatest value is copied to pad any empty entries in table 22). In the example of FIG. 3A, the greatest value Z has been copied to pad entries 38. The number of padding entries 38 can be less than 10, greater than 10, greater than 100, or greater than 1000 depending on the current number of unique values stored in table 22.

Figure 4:
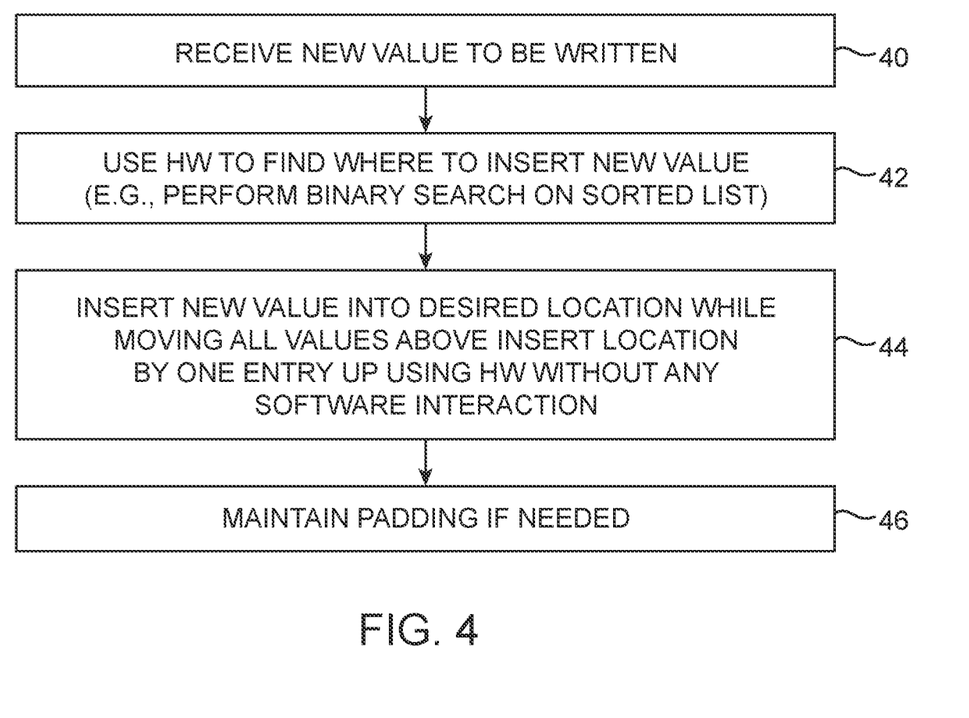
FIG. 4 is a flow chart of illustrative operations involved in performing a hardware accelerated table insertion in accordance with some embodiments.

The operations involved in performing the insert function are best understood in conjunction with the flow chart of FIG. 4. During the operations of block 40, the table update circuitry may receive (from the CPU) a new value to be inserted or written into table 22. The new value to be inserted is shown as "V" in FIG. 3A.

During the operations of block 42, the table update circuitry (e.g., dedicated hardware in the packet processor) can be used to identify where to insert the new value. For example, the binary search algorithm can be used to determine the location of insertion. If desired, other list searching algorithms such as linear search, jump search, interpolation search, exponential search, sublist search, or Fibonacci search can be used. In the example of FIG. 3A, the table update circuitry may determine that the new value V should be inserted above the "U" entry (as indicated by arrow 34).

Figure 3B:
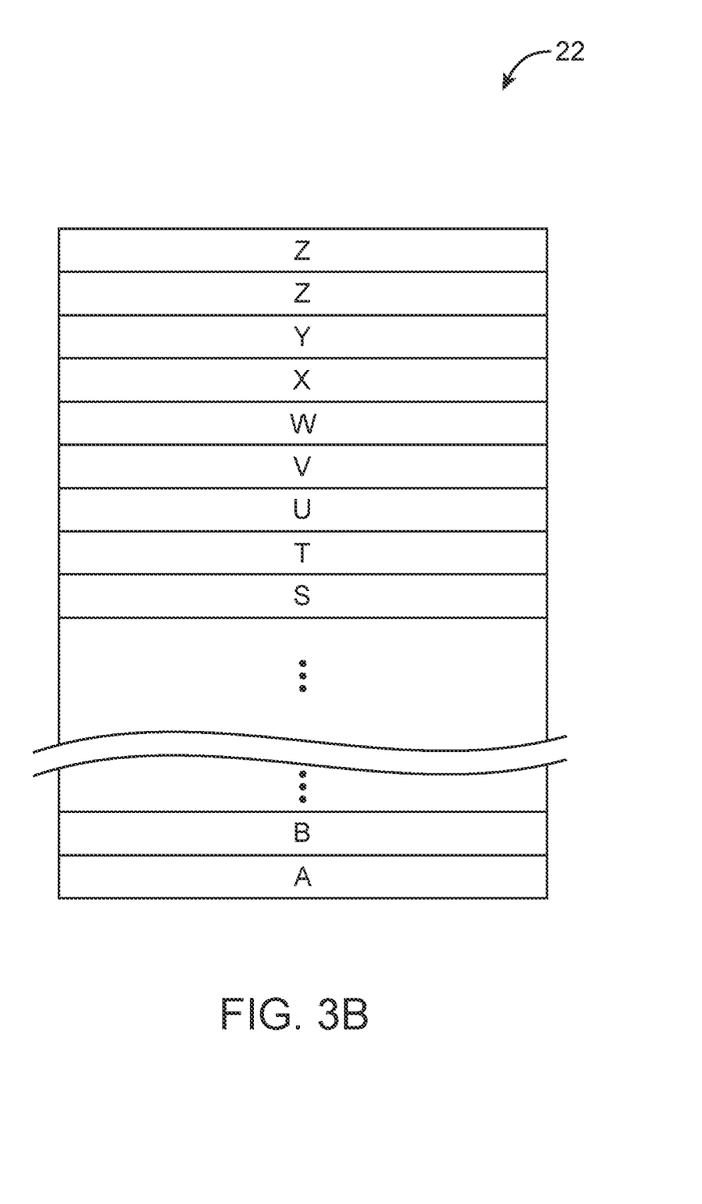
FIG. 3B is a diagram illustrating the sorted list after the new value has been inserted in accordance with some embodiments.

During the operations of block 44, the table update circuitry may insert the new value "V" into the entry currently filled by "W" while copying each entry above the insert location up one position as indicated by arrows 36. This type of shifting data entries up by one position is similar to a bubble search algorithm. The copying of entries as indicated by arrows 36 (each of which can involve one read access from a lower table entry and a subsequent write access to a higher table entry) can be performed using the table update circuitry without any software interaction with the CPU. In other words, the table update circuitry can move (shift or copy) each value subsequent to the insertion location in table 22 by one entry up the list without receiving any additional write access requests from the CPU. Performing the insert function in this way can therefore reduce the number of accesses required to a single CPU access (e.g., the table update circuitry can be configured to perform tens, hundreds, or thousands of write accesses to update table 22 based upon one insertion request received from the CPU without additional interaction with the software running on the CPU). The table update circuitry is therefore sometimes referred to as a hardware accelerated table update circuit. During the operations of block 46, any empty entries at the top of table 22 can optionally be filled to maintain padding. FIG. 3B shows the state of table 22 after the new value "V" has been inserted right above the "U" entry.

The example of FIG. 3A of inserting a single value into table 22 is merely illustrative. In other embodiments, the table update circuitry can be used to insert two or more adjacent values into adjacent locations in table 22, can be used to insert two or more non-adjacent values into different locations in table 22, and/or can generally be used to insert multiple values into table 22 simultaneously or in a pipelined (staggered) fashion. The example of FIG. 3A in which table 22 is a sorted list is also illustrative. If desired, the table update circuitry can also be used to accelerate insert functions on hash tables, linked lists, stacks, queues, trees, heaps, graphs, and/or other types of data structures.

Figure 5A:
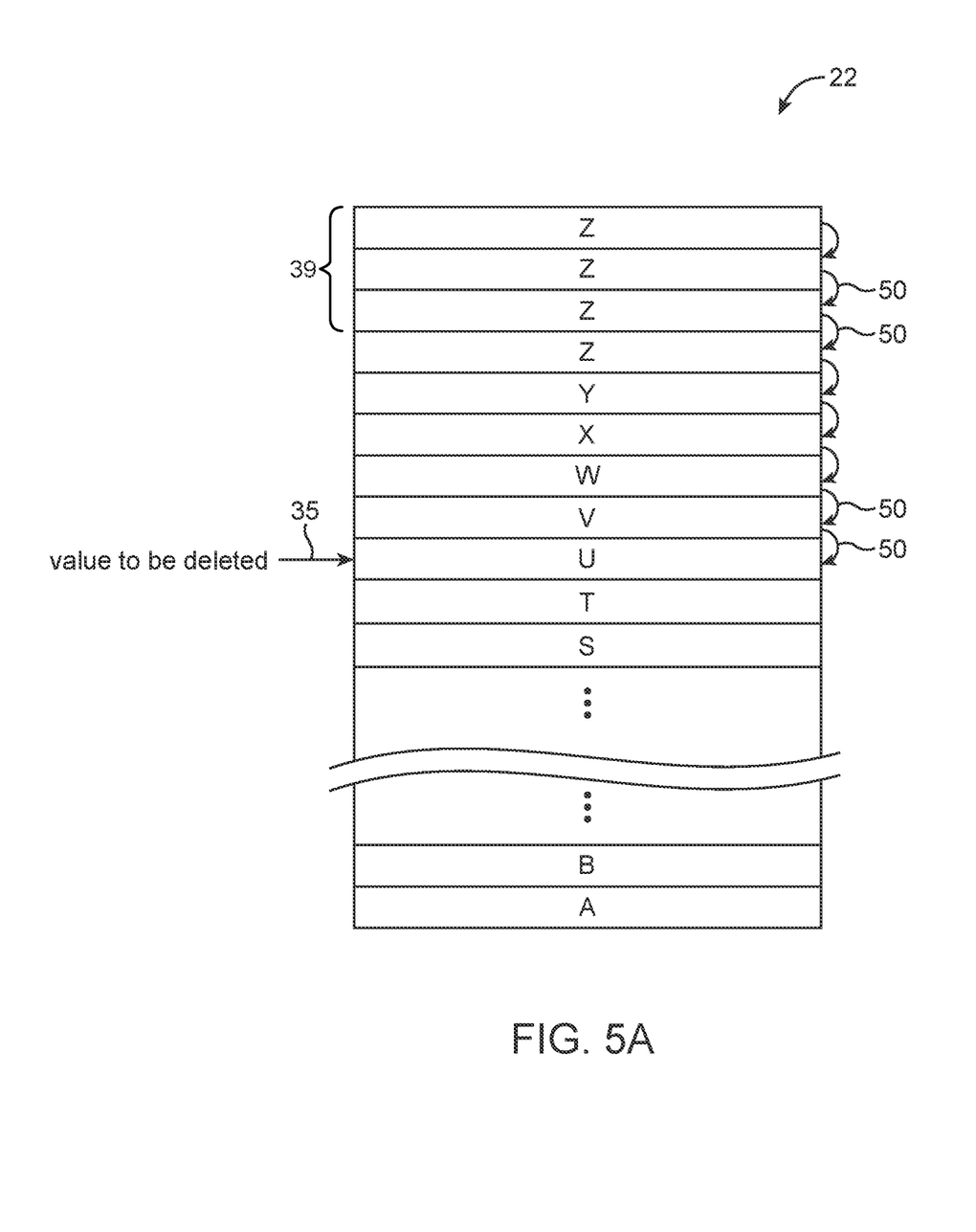
FIG. 5A is a diagram illustrating how an existing value can be deleted from a sorted list in accordance with some embodiments.

The table update circuitry can also be used to delete a value from table 22. FIG. 5A is a diagram illustrating how table update circuitry 24 can be used to delete an existing value from table 22 (e.g., a routing table, a table of keys, or other data structure for storing a list of values). Table 22 may include $2^N-1$ entries, where N can be any positive integer. As examples, table 22 may include 1023 entries (if N is equal to 10), 2047 entries (if N is equal to 11), 4095 entries (if N is equal to 12), 8191 entries (if N is equal to 13), or 16383 entries (if N is equal to 14). Having $(2^N-1)$ number of entries in table 22 can facilitate certain searching algorithms such as the binary search algorithm with a Big O Notation of O(log N) in the worst case.

Table 22 may be maintained as a sorted list of values, where the smallest value is stored at the bottom of the table (see smallest value "A") and where the largest value is stored towards the top of the table (see greatest value "Z"). This is illustrative. If desired, the smallest value can be stored at the top of the table, whereas the largest value can be stored towards the bottom of the table. Device configurations in which the smallest value is stored at the bottom (lowermost) entry of table 22 are sometimes described herein as an example. The number of unique values stored in table 22 might not always be equal to the total size of table 22. In such scenarios, the greatest value in the sorted list can be copied to any remaining entries at the top of table 22 so that all entries are filled (e.g., the greatest value is copied to pad any empty entries in table 22). In the example of FIG. 5A, the greatest value Z has been copied to pad entries 39. The number of padded entries 39 can be less than 10, greater than 10, greater than 100, or greater than 1000 depending on the current number of unique values stored in table 22.

Figure 6:
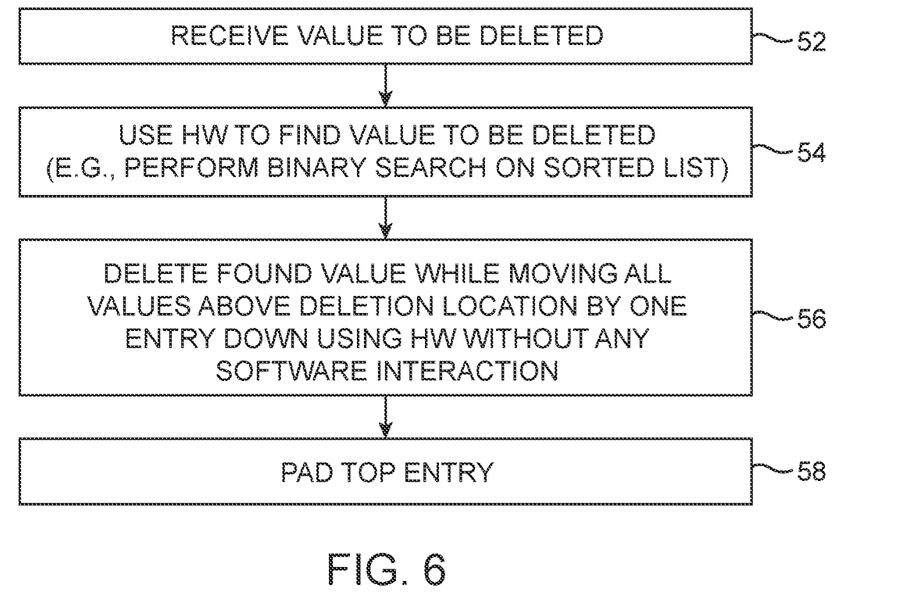
FIG. 6 is a flow chart of illustrative operations involved in performing a hardware accelerated table deletion in accordance with some embodiments.

The operations involved in performing the delete function are best understood in conjunction with the flow chart of FIG. 6. During the operations of block 52, the table update circuitry may receive (from the CPU) a value to be deleted from table 22. In the example of FIG. 5A, the value to be deleted is the "U" entry.

During the operations of block 54, the table update circuitry (e.g., dedicated hardware in the packet processor) can be used to identify the location of the entry to be deleted. For example, the binary search algorithm can be used to determine the location of deletion. If desired, other list searching algorithms such as linear search, jump search, interpolation search, exponential search, sublist search, or Fibonacci search can be used. In the example of FIG. 5A, the table update circuitry may locate entry "U" (as indicated by arrow 35).

Figure 5B:
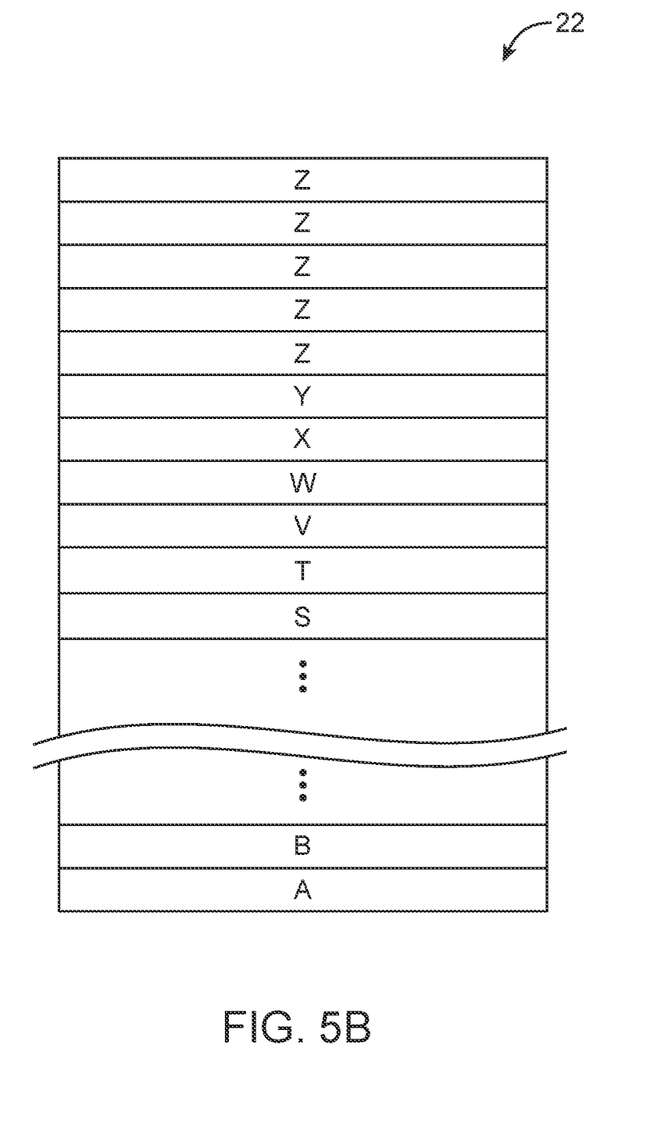
FIG. 5B is a diagram illustrating the sorted list after an existing value has been deleted in accordance with some embodiments.

During the operations of block 56, the table update circuitry may delete the existing value "U" while copying each entry above the delete location down one position as indicated by arrows 50. This type of shifting data entries downwards by one position is similar to a bubble search algorithm. The copying of entries as indicated by arrows 50 (each of which can involve one read access from a higher table entry and a subsequent write access to a lower table entry) can be performed using the table update circuitry without any software interaction with the CPU. In other words, the table update circuitry can move (shift or copy) each value subsequent to the deletion location in table 22 by one entry down the list without receiving any additional write access requests from the CPU. Performing the delete function in this way can therefore reduce the number of accesses required to a single CPU access (e.g., the table update circuitry can be configured to perform tens, hundreds, or thousands of write accesses to update table 22 based upon one deletion request received from the CPU without additional interaction with the software running on the CPU). The table update circuitry is therefore sometimes referred to as a hardware accelerated table update circuit. During the operations of block 58, any empty entries at the top of table 22 can optionally be filled to maintain padding. FIG. 5B shows the state of table 22 after value "U" has been deleted between the "T" and "V" entries.

The example of FIG. 5A of deleting a single value from table 22 is merely illustrative. In other embodiments, the table update circuitry can be used to delete two or more adjacent values from adjacent locations in table 22, can be used to delete two or more non-adjacent values from different locations in table 22, and/or can generally be used to delete multiple values from table 22 simultaneously or in a pipelined (staggered) fashion. The example of FIG. 5A in which table 22 is a sorted list is also illustrative. If desired, the table update circuitry can also be used to accelerate delete functions on hash tables, linked lists, stacks, queues, trees, heaps, graphs, and/or other types of data structures.

Table update circuitry 24 can therefore be used to increase the rate at which large data structures are updated in a network device. Table update circuitry 24 can help accelerate routing table updates, accelerate sFlow key table updates, switch configuration updates, reduce network startup times, improve network performance, reduce power consumption by minimizing the number of transactions being performed by the CPU, and can benefit a variety of data intensive network applications such as high frequency trading platforms.

Figure 7:
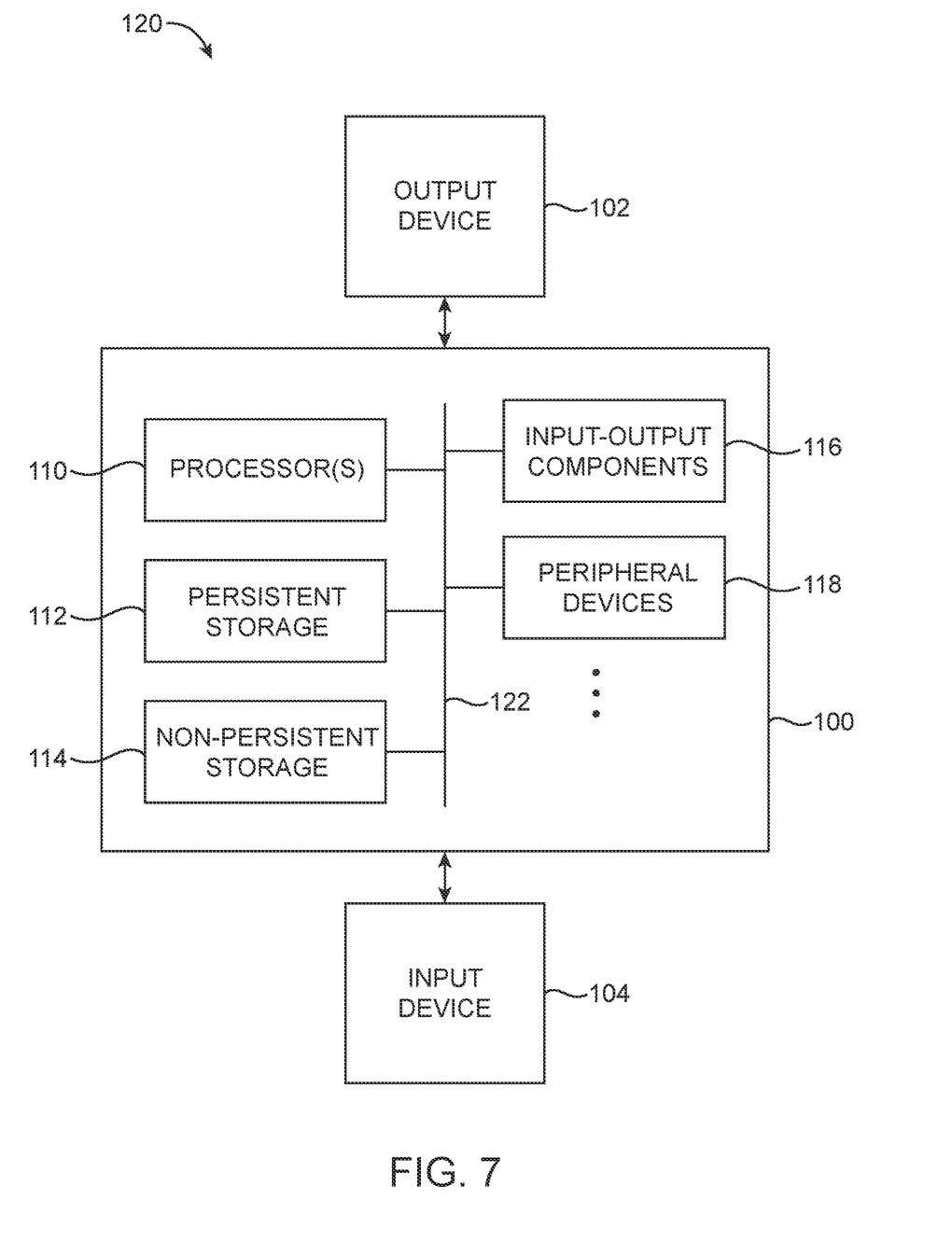
FIG. 7 is a diagram showing illustrative hardware components within a data processing system in accordance with some embodiments.

The foregoing embodiments may be made part of a larger system. FIG. 7 shows a system such as data processing system 120. Data processing system 120 may include a network device 100 optionally coupled to an input device 104 and/or an output device 102. Network device 100 may represent a network device 10 described in connection with the embodiments of FIGS. 1-6. Network device 100 may include one or more processors 110 (e.g., CPU 12 of FIG. 1), storage circuitry such as persistent storage 112 (e.g., flash memory or other electrically-programmable read-only memory configured to form a solid-state drive, a hard disk drive, etc.), non-persistent storage 114 (e.g., volatile memory such as static or dynamic random-access memory, cache memory, etc.), or any suitable type of computer-readable media for storing data, software, program code, or instructions, input-output components 116 (e.g., communication interface components such as a Bluetooth® interface, a Wi-Fi® interface, an Ethernet interface, an optical interface, and/or other networking interfaces for connecting device 100 to the Internet, a local area network, a wide area network, a mobile network, other types of networks, and/or to another network device), peripheral devices 118, and/or other electronic components. These components can be coupled together via a system bus 122.

As an example, network device 100 can be part of a host device that is coupled to one or more output devices 102 and/or to one or more input device 104. Input device(s) 104 may include one or more touchscreens, keyboards, mice, microphones, touchpads, electronic pens, joysticks, buttons, sensors, or any other type of input devices. Output device(s) 106 may include one or more displays, printers, speakers, status indicators, external storage, or any other type of output devices.

System 120 may be part of a digital system or a hybrid system that includes both digital and analog subsystems. System 120 may be used in a wide variety of applications as part of a larger computing system, which may include but is not limited to: a datacenter, a computer networking system, a data networking system, a digital signal processing system, a graphics processing system, a video processing system, a computer vision processing system, a cellular base station, a virtual reality or augmented reality system, a network functions virtualization platform, an artificial neural network, an autonomous driving system, a combination of at least some of these systems, and/or other suitable types of computing systems.

The methods and operations described above in connection with FIGS. 1-7 may be performed by the components of a network device using software, firmware, and/or hardware (e.g., dedicated circuitry or hardware). Software code for performing these operations may be stored on non-transitory computer readable storage media (e.g., tangible computer readable storage media) stored on one or more of the components of the network device. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device (e.g., processor 12 of FIG. 1, processor 110 of FIG. 7, etc.).

The foregoing is merely illustrative and various modifications can be made to the described embodiments. The foregoing embodiments may be implemented individually or in any combination.

What is claimed is:

1. A method of operating a network device having a main processor and a packet processor, the method comprising:
   storing a table of values in the packet processor;
   with the packet processor, receiving from the main processor a value that is used to update the table of values; and
   with the packet processor, updating the table of values based on the value received from the main processor without receiving a plurality of write access requests from the main processor.

2. The method of claim 1, further comprising:
   with table update circuitry in the packet processor, updating the table of values by inserting the value into the table of values or by deleting the value from the table of values.

3. The method of claim 2, wherein the table update circuitry comprises a finite state machine in the packet processor.

4. The method of claim 2, wherein the table of values comprises a sorted list of values.

5. The method of dam 4, wherein the table of values comprises ($2^N-1$) entries and wherein N is a positive integer.

6. The method of claim 5, wherein a smallest value in the sorted list is stored at a first end of the table of values, wherein a largest value in the sorted list is stored towards a second end, opposing the first end, of the table of values, and wherein the largest value is copied to pad one or more entries at the second end of the table of values.

7. The method of claim 6, wherein updating the table of values comprises using the table update circuitry to perform a search to determine an insertion location corresponding to where the value is to be inserted in the table of values or to determine a deletion location corresponding to the value to be deleted from the table of values.

8. The method of claim 7, wherein the table update circuitry is configured to perform a binary search to determine the insertion location and the deletion location.

9. The method of claim 7, wherein inserting the value into the table of values comprises:
   writing the value into the insertion location; and
   moving each value subsequent to the insertion location in the table of values by one entry towards the second end without receiving any write access requests from the main processor.

10. The method of claim 7, wherein deleting the value from the table of values comprises:
    moving each value subsequent to the deletion location in the table of values by one entry towards the first end without receiving any write access requests from the main processor.

11. The method of claim 1, wherein the table of values comprises a routing table.

12. The method of claim 1, wherein the table of values comprises a table of keys associated with a sampled flow (sFlow) protocol.

13. A network device comprising:
    a main processor; and
    a packet processor coupled to the main processor, wherein the packet processor comprises:
        memory for storing a table of values, and
        table update circuitry configured to update the table of values based on an update request received from the main processor and to carry out the update request by performing a plurality of write accesses to the memory based on a single access from the main processor without receiving a plurality of additional write access requests from the main processor.

14. The network device of claim 13, wherein the table update circuitry is configured to update the table of values based on an insertion request or a deletion request received from the main processor.

15. The network device of claim 14, wherein the table update circuitry is further configured to perform a search to determine an insertion location corresponding to where a new value is to be inserted in the table of values due to the insertion request or to determine a deletion location corresponding to an existing value to be deleted from the table of values due to the deletion request.

16. The network device of claim 15, wherein the table update circuitry is further configured to complete the insertion request by writing the new value into the insertion location and by shifting each value subsequent to the insertion location in the table of values by one entry in a first direction.

17. The network device of claim 16, wherein the table update circuitry is further configured to complete the deletion request by shifting each value subsequent to the insertion location in the table of values by one entry in a second direction opposing the first direction.

18. An apparatus comprising:
   a housing;
   a first processor disposed within the housing; and
   a second processor disposed within the housing and configured to store a table of values and to receive a table update request from the first processor, the second processor having a finite state machine configured to carry out the table update request by performing a plurality of write accesses to the table of values without receiving a plurality of write access requests from the main processor.

19. The apparatus of claim 18, wherein the first processor comprises a central processing unit, and wherein the second processor comprises a field programmable gate array (FPGA) or an application specific integrated circuit (ASIC).

* * * * *